(12) United States Patent
Poulakis

(10) Patent No.: US 11,945,146 B2
(45) Date of Patent: Apr. 2, 2024

(54) CONNECTING PART, A TOOL FOR PRODUCING A CONNECTING PART AND FASTENING SYSTEM HAVING CONNECTING PART

(71) Applicant: GOTTLIEB BINDER GMBH & CO. KG, Holzgerlingen (DE)

(72) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 928 days.

(21) Appl. No.: 16/401,216

(22) Filed: May 2, 2019

(65) Prior Publication Data

US 2019/0263038 A1    Aug. 29, 2019

Related U.S. Application Data

(62) Division of application No. 14/787,047, filed as application No. PCT/EP2014/001356 on May 20, 2014, now Pat. No. 10,343,317.

(30) Foreign Application Priority Data

May 28, 2013 (DE) ..................... 10 2013 009 091.1

(51) Int. Cl.
*A44B 18/00* (2006.01)
*A44B 13/00* (2006.01)
(Continued)

(52) U.S. Cl.
CPC .......... *B29C 45/26* (2013.01); *A44B 13/0052* (2013.01); *A44B 18/0076* (2013.01);
(Continued)

(58) Field of Classification Search
CPC . B29C 45/26; B29C 44/1271; B29C 45/0025; B29C 45/14786; A44B 13/0052;
(Continued)

(56) References Cited

U.S. PATENT DOCUMENTS 4,297,442 A    10/1981    Blahak
4,563,380 A *    1/1986    Black ................. A44B 18/0076
                                                              428/317.1
(Continued)

FOREIGN PATENT DOCUMENTS

CA        2 220 732       5/1998
CN        1126943 A      7/1996
(Continued)

OTHER PUBLICATIONS

International Search Report (ISR) dated Sep. 8, 2014 in International (PCT) Application No. PCT/EP2014/001356.

*Primary Examiner* — David M Upchurch
(74) *Attorney, Agent, or Firm* — WENDEROTH, LIND & PONACK, L.L.P.

(57) ABSTRACT

A connecting part (3) is formed by injection moulding. A closure part (11) forms a component of an adhesive closure having adhesive or hooking elements and is introducible as an insert part into an injection mould. In a back-injection process, the connecting part (3) forms a structural part containing the closure part (11) as an integral component.

17 Claims, 12 Drawing Sheets

(51) Int. Cl.
  *B29C 44/12* (2006.01)
  *B29C 45/00* (2006.01)
  *B29C 45/14* (2006.01)
  *B29C 45/26* (2006.01)
  *B60N 3/04* (2006.01)
  *F16B 11/00* (2006.01)
  *B29K 77/00* (2006.01)
  *B29K 79/00* (2006.01)
  *B29K 101/12* (2006.01)
  *B29K 105/04* (2006.01)
  *B29L 31/00* (2006.01)

(52) U.S. Cl.
  CPC ........ *A44B 18/008* (2013.01); *B29C 44/1271* (2013.01); *B29C 45/0025* (2013.01); *B29C 45/14786* (2013.01); *B60N 3/046* (2013.01); *F16B 11/006* (2013.01); *B29K 2077/00* (2013.01); *B29K 2079/08* (2013.01); *B29K 2101/12* (2013.01); *B29K 2105/04* (2013.01); *B29L 2031/729* (2013.01)

(58) Field of Classification Search
  CPC .. A44B 18/0076; A44B 18/008; B60N 3/046; F16B 11/006; B29K 2077/00; B29K 2079/08; B29K 2101/12; B29K 2105/04; B29L 2031/729
  See application file for complete search history.

(56) References Cited

U.S. PATENT DOCUMENTS

| | | | |
|---|---|---|---|
| 4,617,214 A | 10/1986 | Billarant | |
| 4,693,921 A * | 9/1987 | Billarant | B60N 2/5825 24/444 |
| 4,726,975 A | 2/1988 | Hatch | |
| 4,802,939 A * | 2/1989 | Billarant | B29C 33/0044 24/444 |
| 4,842,916 A * | 6/1989 | Ogawa | B29C 70/68 24/444 |
| 5,058,245 A | 10/1991 | Saito | |
| 5,540,970 A | 7/1996 | Banfield et al. | |
| 5,598,610 A * | 2/1997 | Torigoe | B29C 70/682 24/444 |
| 5,766,723 A | 6/1998 | Obory et al. | |
| 5,786,061 A | 7/1998 | Banfield | |
| 5,900,303 A * | 5/1999 | Billarant | A44B 18/0076 24/442 |
| 5,942,177 A | 8/1999 | Banfield | |
| 5,945,193 A | 8/1999 | Pollard et al. | |
| 6,451,239 B1 | 9/2002 | Wilson | |
| 6,460,230 B2 * | 10/2002 | Shimamura | A44B 18/0076 24/442 |
| 6,489,003 B1 | 12/2002 | Leviit et al. | |
| 7,431,976 B2 * | 10/2008 | Hermann | A44B 18/0076 24/442 |
| 7,444,722 B2 * | 11/2008 | McDaniel | A61F 13/5611 604/385.03 |
| 8,281,463 B2 * | 10/2012 | Hammer | A44B 18/0061 24/452 |
| 10,144,366 B2 * | 12/2018 | Tuma | F16B 5/07 |
| 2003/0134083 A1 | 7/2003 | Wang | |
| 2005/0153097 A1 | 7/2005 | Wang et al. | |
| 2005/0186385 A1 | 8/2005 | Janzen | |
| 2005/0189811 A1 | 9/2005 | Herrmann et al. | |
| 2005/0235462 A1 | 10/2005 | Takahashi et al. | |
| 2006/0110572 A1 | 5/2006 | Herrero et al. | |
| 2008/0169388 A1 | 7/2008 | Torigoe et al. | |
| 2008/0222856 A1 | 9/2008 | Poulakis | |
| 2010/0181817 A1 | 7/2010 | Tanaka et al. | |
| 2014/0053377 A1 * | 2/2014 | Poulakis | F16B 5/07 24/306 |
| 2014/0130333 A1 | 3/2014 | Jonsson et al. | |
| 2022/0112324 A1 | 4/2022 | Park et al. | |

FOREIGN PATENT DOCUMENTS

| | | |
|---|---|---|
| CN | 1281343 A | 1/2001 |
| CN | 1305759 A | 8/2001 |
| CN | 1638664 A | 7/2005 |
| CN | 1937933 A | 3/2007 |
| CN | 1942116 A | 4/2007 |
| CN | 1949995 A | 4/2007 |
| DE | 94 12 527 | 2/1995 |
| DE | 195 10 942 | 10/1995 |
| DE | 195 11 674 | 10/1995 |
| DE | 196 51 675 | 6/1997 |
| DE | 198 28 856 | 10/1999 |
| DE | 696 18 762 | 10/2002 |
| DE | 10 2004 015 321 | 10/2005 |
| DE | 10 2008 007 913 | 8/2009 |
| DE | 10 2009 054 896 | 6/2011 |
| DE | 10 2011 104 886 | 12/2012 |
| DE | 10 2013 009 091 | 12/2014 |
| EP | 0 246 221 | 11/1987 |
| EP | 0 465 983 | 1/1992 |
| EP | 1 481 603 | 12/2004 |
| EP | 1 116 450 | 7/2011 |
| EP | 2 609 826 | 7/2013 |
| JP | 5-211910 | 8/1993 |
| JP | 3181929 | 2/2013 |
| WO | 92/19119 | 11/1992 |
| WO | 98/20766 | 5/1998 |
| WO | 2009/103260 | 8/2009 |
| WO | 2012/025980 | 3/2012 |

* cited by examiner

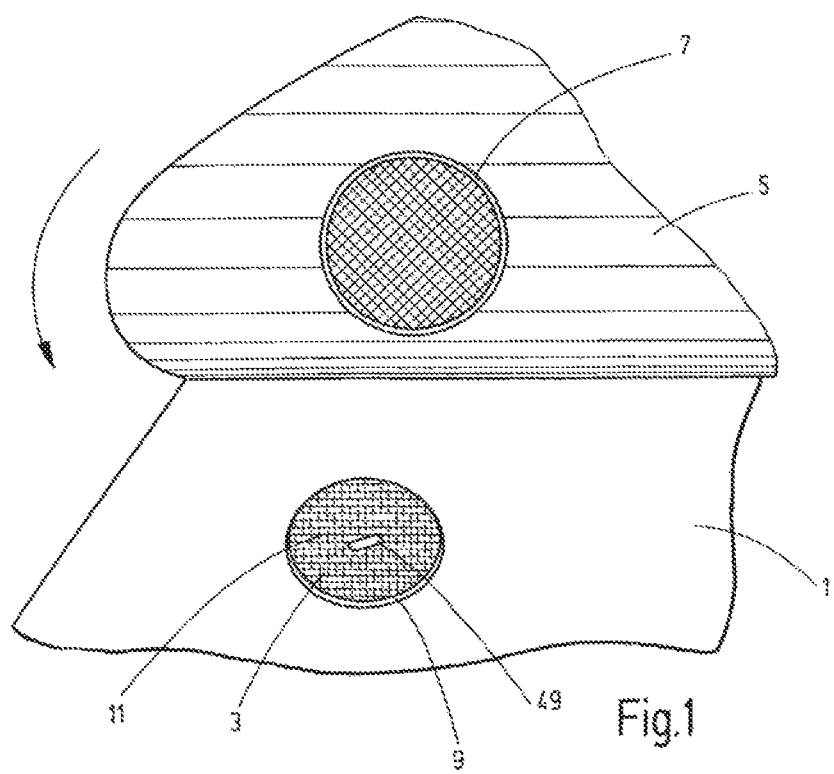
Fig. 1
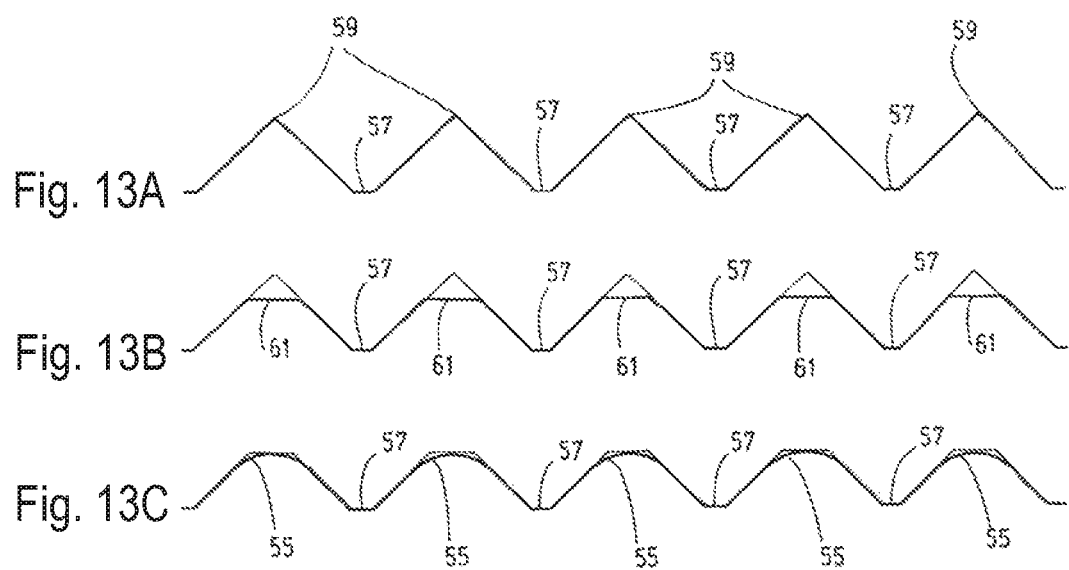
Fig. 13A
Fig. 13B
Fig. 13C

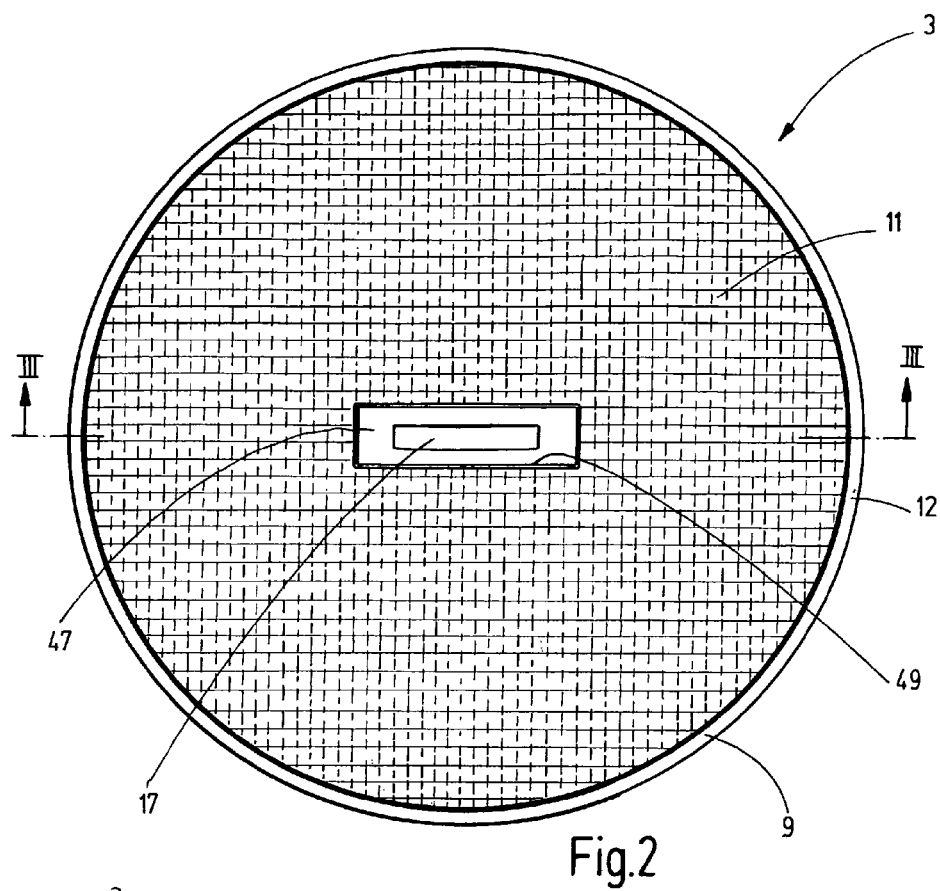
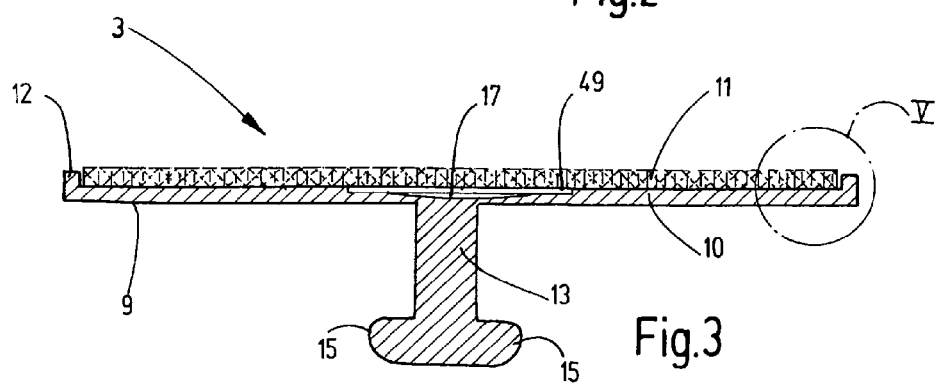

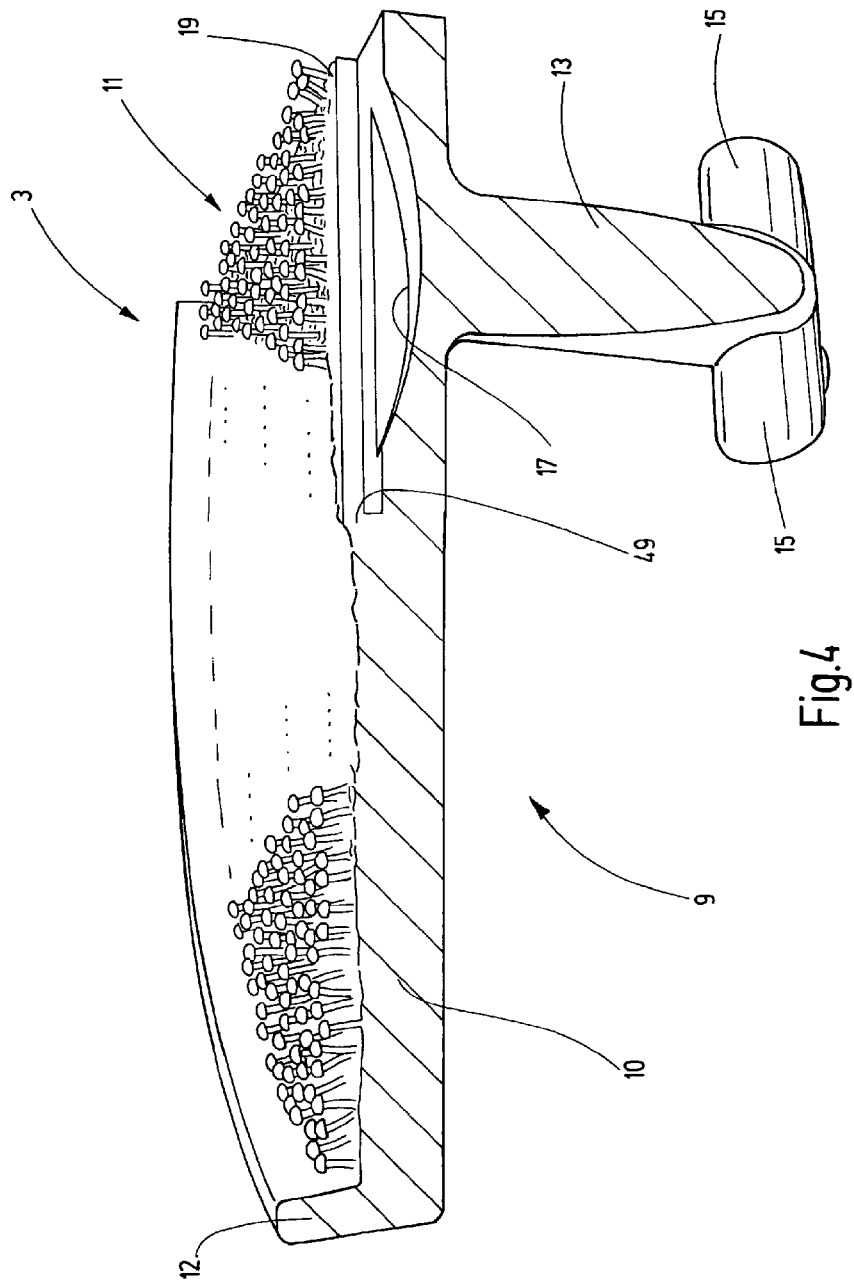

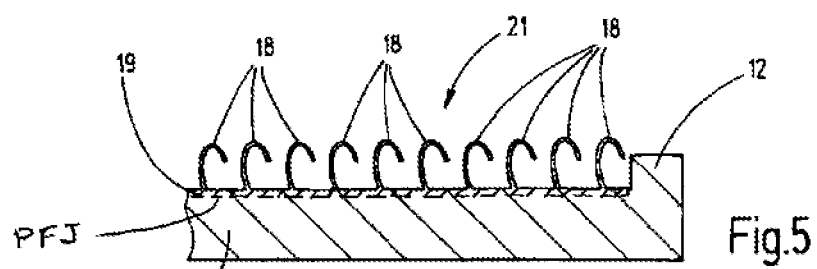
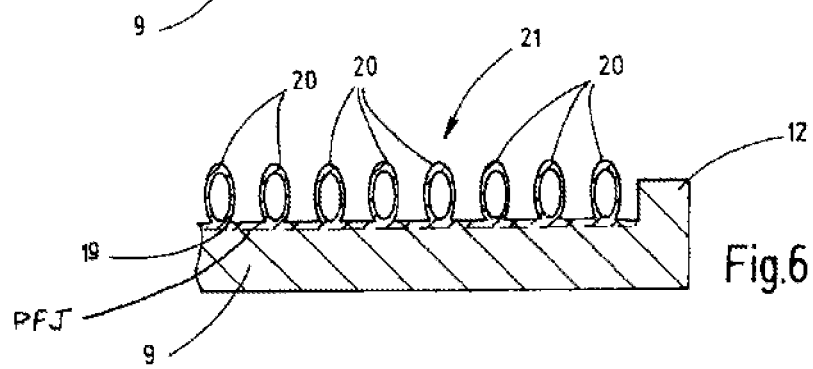
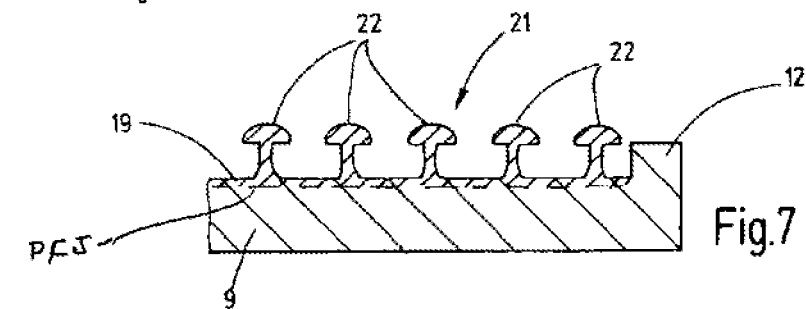
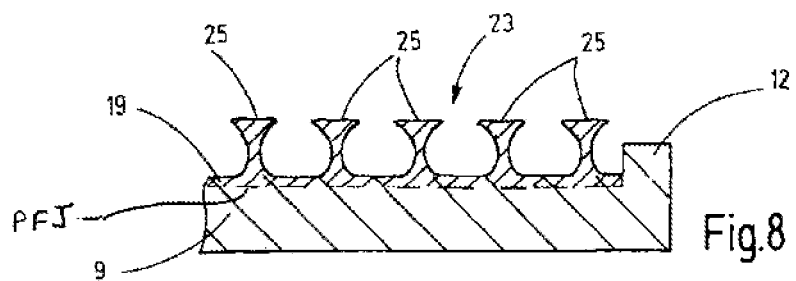

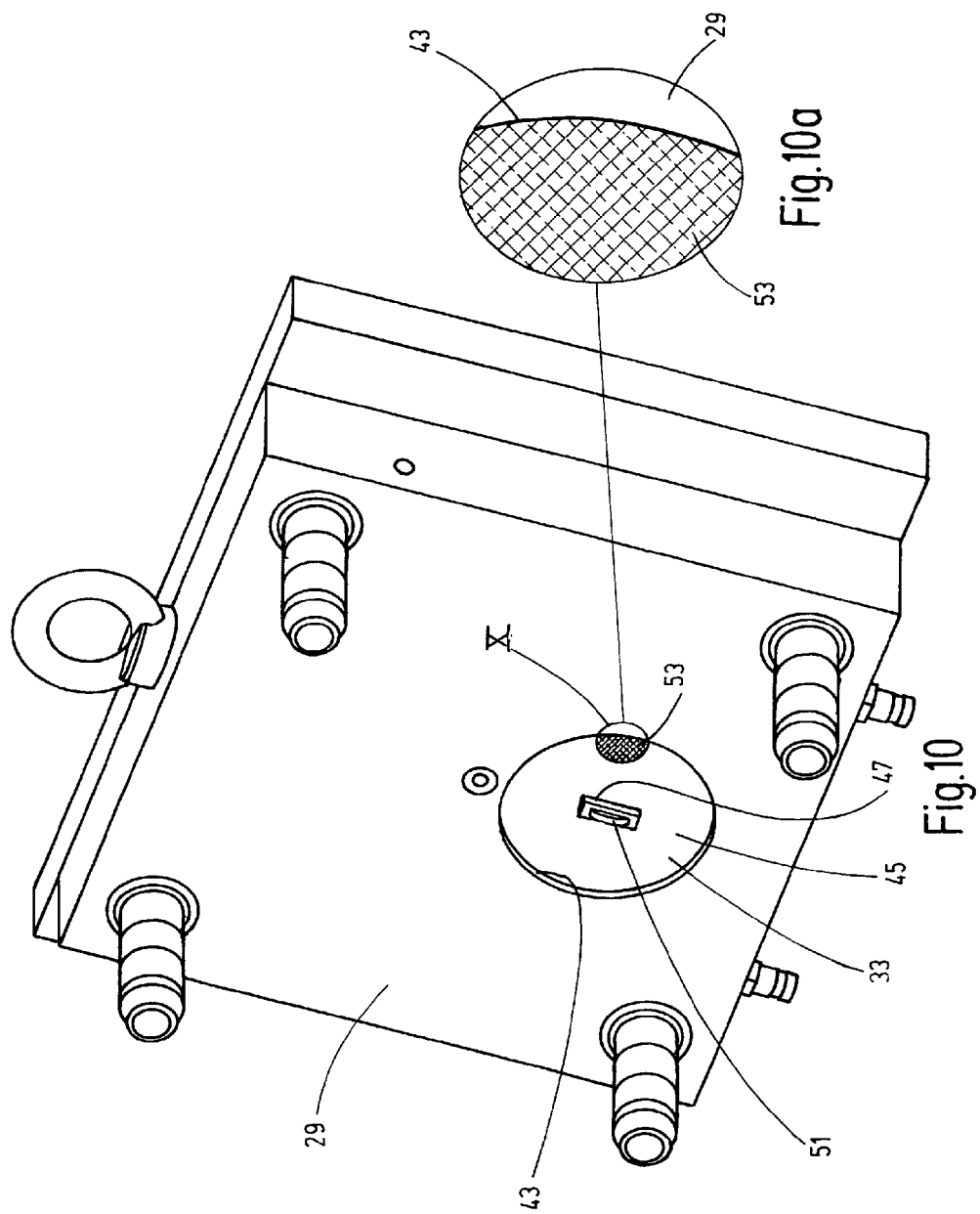

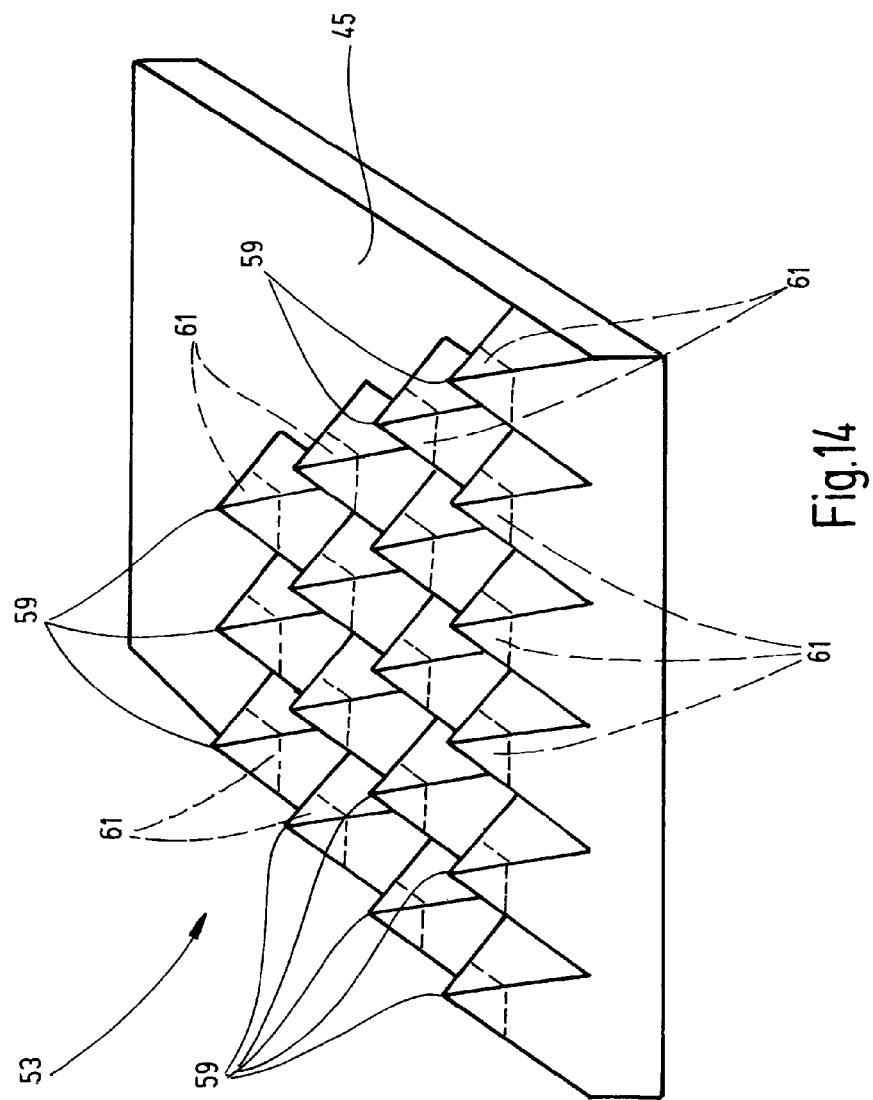

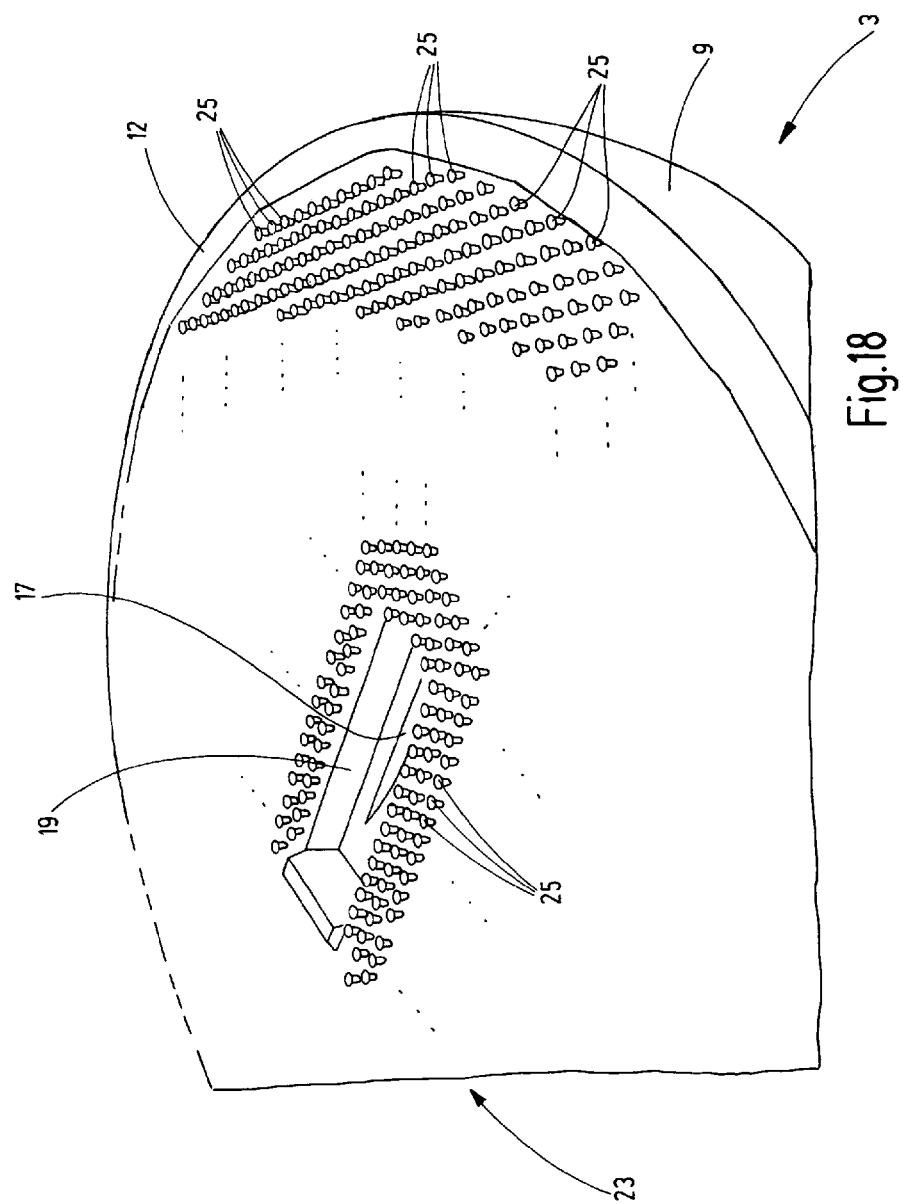

CONNECTING PART, A TOOL FOR PRODUCING A CONNECTING PART AND FASTENING SYSTEM HAVING CONNECTING PART

REFERENCE TO RELATED APPLICATION

This application is a Divisional application of U.S. patent application Ser. No. 14/787,047, filed Oct. 26, 2015, the entire subject matter of which is hereby incorporated by reference.

FIELD OF THE INVENTION

The invention relates to a method for producing a connecting part using an injection molding process, preferably using a thermoplastic synthetic material. Specifically, the invention relates to the production of a connecting part, which has a fastening part having adhesive and/or hooking elements on one side. The fastening part forms a component of a contact fastener. The connecting part may be part of a fastening system, in which system attachment parts are provided to form a contact fastener connection to a component that is to be connected. The attachment parts have adhesive and/or hooking elements, which can be releasably engaged with the corresponding adhesive and/or hooking elements of the respective connecting part. In addition, the invention relates to a tool for producing a connecting part of this kind.

BACKGROUND OF THE INVENTION

Contact fastener connections are used in many areas to fasten objects or components such that they can be detached again. In motor vehicles, to prevent the mats from slipping or lifting up, the mats are frequently secured to the vehicle floor in such a way that connecting parts, which are anchored to the floor, and which have adhesive or hooking elements, are brought into adhesive contact or interlocking engagement with attachment parts, which are fastened to the floor mats, and which have corresponding adhesive or hooking elements. In the prior art, the connecting parts are designed having a disk-shaped base body, which can be anchored to the vehicle floor. On the upper side of that base body, a contact fastening part having adhesive or hooking elements is attached. This attaching is done by chemical or thermal adhesive bonds, for example using adhesives or hot glues that contain solvents. Apart from the environmental impact associated with solvent-containing substances, neither the chemical, nor the thermal adhesive bonds are satisfactory. As has been shown, when used in floor mats in motor vehicles, there is a risk that the contact fastening part and the base body will become detached from one another when the temperature and/or the relative humidity in the vehicle is too high. There is also a risk of detachment when the floor mat has been used for an extended period of time. This constitutes a safety risk, in particular when the floor mat on the driver's side slides forward towards the pedals while driving, which sliding can lead to uncertainty on the part of the driver and may possibly result in an accident.

To avoid the risk that the contact fastening part may become detached from the base body, a solution disclosed in DE 10 2009 054 896 A1 is also prior art. According to prior art, the connecting part is produced in such a way that the base body and hooks are simultaneously formed as contact fastening elements in a single process step in an injection mold. Although in this procedure, there is practically no risk of detachment, the number of hooks that can be formed in the injection mold in which the base body is molded is nevertheless extremely limited, for example to a number not exceeding 50 hooks per $cm^2$. Such a limited achievable packing density of the hooking elements is not satisfactory.

SUMMARY OF THE INVENTION

An object of the invention is to provide an improved method permitting production of a connecting part having a contact fastener part, which can be reliably detachably connected to the base body, and at the same time, which is characterized by adhesive or hooking elements having a high degree of packing density.

This object is basically achieved according to the invention by a method having, an essential feature of the invention, a first step of producing a fastening part having adhesive and/or hooking elements and constituting a component of a contact fastener.

The fastening part is produced, at least in part, from at least one synthetic material, and is introduced as an insertion part into an injection mold. In a second step, at least one additional or different synthetic material is introduced into the injection mold by a back injection process at a predefinable pressure and at a predefinable temperature to form a base body. That additional synthetic material is introduced in such a way that the respective additional synthetic material, at least in part, forms a common molten mass with the at least one synthetic material of the fastening part. After the cooling of the synthetic materials, the fastening part, together with the base body firmly are bonded thereto and form the connecting part as an integrated composite component. This method opens up the possibility of using a fastening part as an insertion part, which is produced in a separate production process, which is oriented towards fastening parts of modern contact fasteners, and in which adhesive or hooking elements of various kinds are provided. Thus, in addition to hooks, loops or mushroom-shaped elements having round or flat heads can be produced having a very high degree of packing density using the special method provided therefor. Because in a second step, in which an insertion part is introduced into the injection mold by a back injection process, the connecting part is formed in a separate step, in which the insertion part is back injected. The connecting part is then made an integral component with the fastening part, from which the connecting part cannot be detached due to the firmly bonded connection created during the back injection process.

The fastening part that forms the insertion part is preferably produced from a synthetic material having a planar support part. On one side of the support part, the adhesive or hooking elements are integrally formed with the support part and project from the support part.

Preferably, the support part is kept free of anchoring elements, such as mushroom-shaped, hook-shaped or loop-shaped elements on the side of the support part facing the base body, to produce an evenly extending, planar fused joint across larger areas between the synthetic materials of the fastening part and base body in the injection mold.

In a particularly advantageous manner, an insertion part may be used. The adhesive or hooking elements of the insertion part are formed by a mold from the thermoplastic synthetic material of the support part, for example from polyamide 6, polyamide 6.6, polyamide 12.

An insertion part may also be used with a support part, which comprises a single-thread knitted fabric made of a synthetic material, such as polyamide 6, polyamide 6.6, polyphenylsulfone. Adhesive or hooking elements are formed from filaments of the single-thread knitted fabric.

In addition, an insertion part may also be used with a support part, which comprises a multi-thread knitted fabric made of synthetic material such as polyamide 6, polyphenylsulfone, polypropylene. Adhesive or hooking elements are formed from filaments of the multi-thread knitted fabric.

In a particularly advantageous manner, a polyamide or polypropylene, preferably having glass fiber reinforcement, may be used as a synthetic material for the back injection process.

The same synthetic material may also be used for the back injection process as was used for the production of the insertion part as well. In the production of a good bonded connection, advantageously the connection partners have the same or at least similar softening and melting temperatures.

In a particularly advantageous manner, the side of the support part of the insertion part that is free of adhesive or hooking elements may be provided with a coating of polyurethane. The polyurethane acts as a reaction mediator during the back injection process, and is applied prior to the introduction of the insertion part into the injection mold. An additive of this kind facilitates the formation of a firmly bonded connection during back injection. When producing the connection, a solvent-free, moisture-curing hot-melt adhesive based on reactive polyurethane prepolymers may also serve as a reaction mediator or adhesive. The hot-melt adhesive may contain at least one polyester polyol in a concentration between 10% and 90%, possibly polyether polyol in a concentration between 0% through 50%, as well as at least polydisocyanate in a concentration by weight between 5% and 35%.

The back injection process provided for in the invention is a technique such as that described on page 118 of the technical publication "Spritzgießwerkzeuge kompakt" [Understanding Injection Molds] by Harry Pruner and Wolfgang Nesch, for example, based on an example, in which a decorative material is permanently bonded with a part made of synthetic material. The firmly bonded connection is formed by the introduction of a thermoplastic molten mass into the decorative material.

The subject matter of the invention is also a connecting part produced by the method according to the invention. The connecting part has a base body, preferably in the form of a flat disk, which base body has a fastening part having adhesive or hooking elements on one side and preferably has an anchoring or other fixing device for affixing the disk to a structure on the side that is free of the adhesive or hooking element. The base body may also comprise another support part, in particular in the form of a disk, or may be a component of a structurally larger system, for example in the form of automotive parts, such as chassis components. A layer of adhesive or an additional adhesive or fastening part may also serve as a fixing device, as is used on the upper side of the base body.

In a preferred embodiment, the disk is round. The anchoring device has an anchoring stud, which projects from the central region of the base body as an integral part thereof.

The anchoring stud is provided for the retaining engagement in an opening of the structure.

At least one laterally projecting retaining element may be provided on the anchoring stud. Retaining elements in the form of catches, which project laterally diametrically to one another, or spiral ridges, which form an outer thread, may preferably be provided.

The subject matter of the invention is also a tool for producing a connecting part according to the invention by the method according to the invention. The tool has an injection mold, which has a first tool part having a first mold cavity for a back injection process. The mold cavity forms at least a large part of the base body. A second tool part closes the first mold cavity in a back injection process, thereby forming a second mold cavity, into which second cavity the insertion part, which forms the fastening part, can be introduced.

The second mold cavity preferably has a device for positioning and retaining the insertion part that has been introduced.

As such, the arrangement may be especially advantageously made such that the second mold cavity has a contact surface, on which the insertion part can be placed with the side having the adhesive or hooking elements. The device for positioning and retaining has a mold part in the central region, which projects out of the contact surface. That mold part engages in a recess in the insertion part, which is designed for the mold part. As a result, the insertion part is secured in an aligned position.

This mold part may have the form of a rectangular ridge, the contour of which is adapted to the recess of the insertion part. The ridge has a projection in the form of a protuberance, which forms a depression in the base body during the back injection process. A depression formed in this way can facilitate the attachment of the connecting part to a structure by turning the connecting part through the intervention of a turning tool.

In particularly advantageous exemplary embodiments, the entire contact surface of the second mold cavity is provided with micro-contouring having a pattern of fine depressions and projections. In adapting to the microstructure of the adhesive or hooking elements, structuring of this kind facilitates the contact of the elements with the wall of the mold.

The subject matter of the invention is also a fastening system for affixing a component by at least one connecting part produced by the method of the invention. Each connecting part is allocated to an attachment part that is connected to the component having adhesive or hooking elements, which can be releasably engaged with the corresponding adhesive or hooking elements of the connecting part.

The respective attachment parts may be designed such that they are also disk-shaped, and thus adapted to the form of the connecting parts.

In a particularly advantageous manner, to secure the position of a floor mat of a motor vehicle, the respective connecting parts can be anchored to the floor of the motor vehicle and the attachment parts can be attached to the floor mat.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 1 is a perspective view of a partial section of the floor of a motor vehicle, and a mat, which is partially attached to the floor, the mat being provided with a fastening system having connecting parts according to the invention;

FIG. 2 is a top view of an exemplary embodiment of a connecting part according to the invention;

FIG. 3 is a side view in section taken along the section line III-III of FIG. 2;

FIG. 4 is a greatly enlarged perspective view of a partial section of the exemplary embodiment of the connecting part having the same sectional plane as that shown in FIG. 3;

FIG. 5 is an enlarged side view in section of the area designated as V in FIG. 3, wherein hooking elements of the associated fastening part have been greatly schematically simplified and are not depicted to scale;

FIGS. 6 to 8 are enlarged partial side views in section of area V in FIG. 3 with each figure having different adhesive or hooking elements of the fastening part;

FIG. 10 is a perspective view of a second tool part of the injection mold for producing a connecting part according to an exemplary embodiment of the invention;

FIG. 10a is an enlarged front view of the region designated as X in FIG. 10;

FIGS. 13A-13C are sketched side views of the work steps for producing a micro-contour on a mold wall of the second tool part of the injection mold of FIG. 10;

FIG. 14 is a microscopically enlarged, schematic perspective view, of the micro-contour in a partially completed state;

FIG. 18 is an enlarged perspective view of an exemplary embodiment of the connecting part with a fastening part having adhesive elements, which have planar surface parts on the upper side thereof.

DETAILED DESCRIPTION OF THE INVENTION

Figure 9:
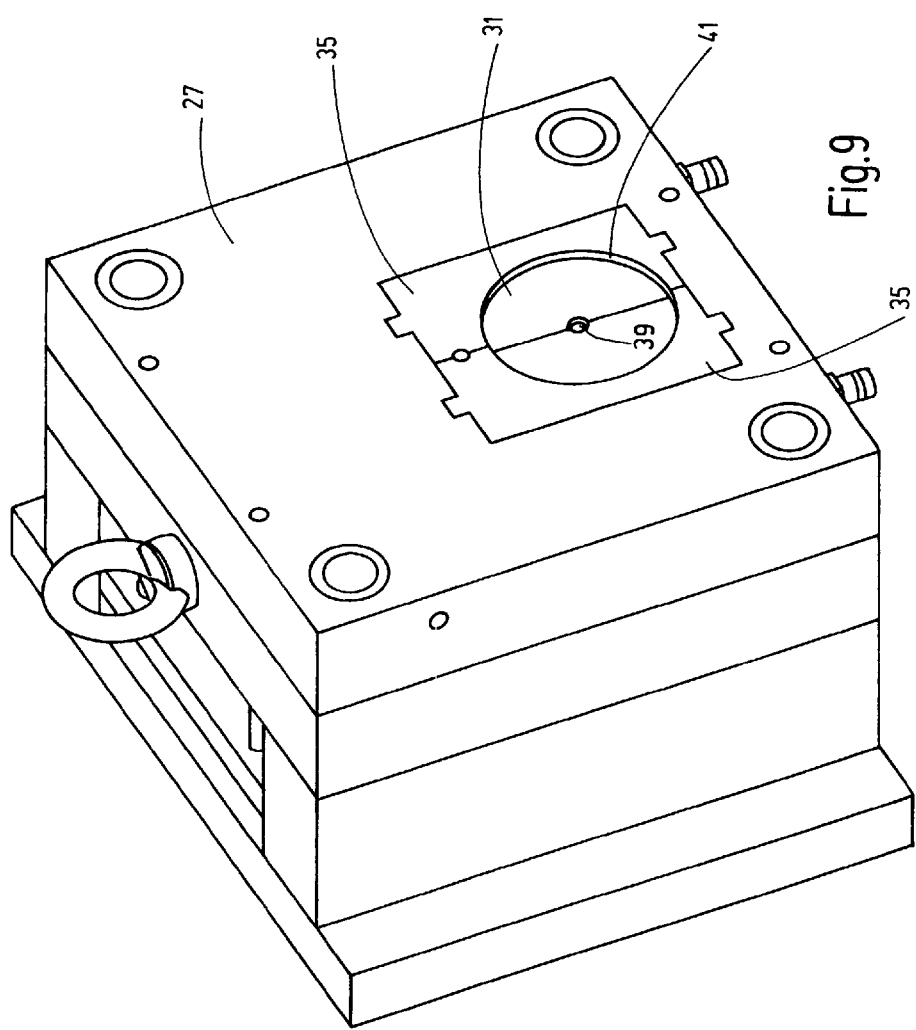
FIG. 9 is a perspective view of a first tool part of an injection mold for producing a connecting part according to an exemplary embodiment of the invention.
Figure 12:
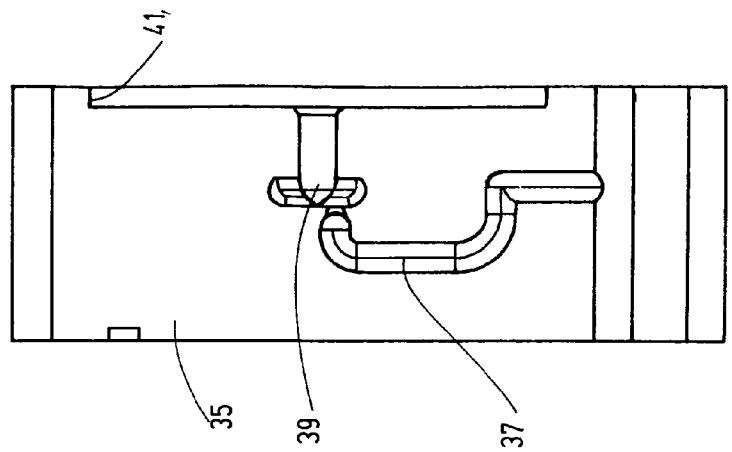
FIG. 12 is a side view of one of the mold parts from FIG. 11, as viewed from the side facing the other mold part.

The invention is explained in greater detail below on the basis of an example of the production of a connecting part, which is part of a fastening system for affixing a floor mat to the floor of a motor vehicle. The connecting parts according to the invention may be used advantageously in other areas of application, in which contact fasteners are used, whether this be in the industrial, sporting or leisure sectors and the like. FIG. 1 shows a schematic partial area of the floor of a motor vehicle 1 having a connecting part in the form of a connection disk 3 corresponding to an exemplary embodiment of the invention anchored on the vehicle floor. In addition, FIG. 1 shows a part of the floor mat 5 in a position prior to being placed on the floor 1. In the case of the floor mat 5, in the example shown, the mat is a rubber mat, which can be placed on the floor 1 as an accessory part. Likewise, this may be a mat, which may form a standard part of the vehicle, for example in the form of a textile mat. Attachment parts 7 are provided on the floor mat 5 as components of a contact fastener, which attachment parts, like the disks 3 on the floor of the vehicle 1, have a circular contour and adhesive and hooking elements, for example a fleece material, in order to form a contact fastener connection with the disks 3. In FIG. 1, only one pair consisting of disk 3 and attachment part 7 from among the number of pairs in question can be seen.

FIG. 2 shows an exemplary embodiment, approximately twice the size of a practical embodiment, of the connecting part in the form of the disk 3 having a round base body 9. Base body 9 includes a fastening part 11 having adhesive or hooking elements on the upper side of the base body shown in FIG. 2. The elements merely are indicated in a schematic manner in FIG. 2, and likewise in the sectional view in FIG. 3. An anchoring stud 13 is integrally formed on the base body 9, in the central region on the underside thereof facing away from the fastening part 11. At the free end of the stud, anchoring catches 15 project laterally diametric to one another, see also FIG. 4. As is shown most clearly in FIGS. 2 and 4, a recessed depression 17 is molded in the upper side, centrally located in the base body 9. This depression facilitates the rotation of the disk 3 when the disk is anchored to the floor 1. The stud 13 is inserted through a slot opening of the floor 1 and then turned. The fastening part 11 is prefabricated as an insertion part for the molding process, for example by punching out round sections from the length of a contact fastener material. Because the fastening part is introduced as an insertion part into an injection mold and the injection process is carried out using a back injection technique when the base body 9 is shaped, in the finished state shown in FIGS. 2 through 4, the fastening part 11 forms a single-piece, integral component of the disk 3. As is shown particularly clearly in FIGS. 2 and 4, the base body 9 comprises a disk-shaped base plate 10, the outer circumference of which transitions into a raised outer edge 12. In a practical embodiment, the base plate 10 has a diameter of 60 mm. In the embodiment according to FIG. 4, the height of the outer edge 12 is greater than the height of the individual adhesive or hooking elements of the fastening part 11 joining the base of the disk. In this way, the adhesive or hooking elements can be protected against damage both from above, and from the side. As viewed from the front side of the disk 3, those elements are fully accessible to mesh or engage with a corresponding fastening material, for example in the form of loop material, which is located on the respective attachment 7 part on the floor mat 5.

In a highly schematically simplified and enlarged view of the area designated as V in FIG. 3, FIGS. 5 through 8 illustrate a plurality of variants of the design of the fastening part 11 having different kinds of hooking elements 21 (FIGS. 5 through 7) or adhesive elements 23 (FIG. 8) located on a support part 19, which support part 19 is connected to the base body 9 by a planar fused joint PFJ of the materials of the support part 19 and the base body 9. Thus, FIG. 8 shows adhesive elements 23, which make an adhesion attachment on smooth opposing surfaces possible through planar surfaces 25 on the widened head parts opposite the stems by van der Waals forces, but also a locking action with corresponding elements of the same kind or having the shape of a mushroom head. When using adhesive elements 23 having an adhesion behavior, the projecting, planar head surfaces 25 of such adhesive elements 23 can be allowed advantageously to project above the outer edge 12 of the disk by a predeterminable distance such that said head surfaces can be locked in place by a corresponding film material, which may be a component of the floor-foot mat 5 and which is to be placed on the disk 3. FIGS. 5 through 7 depict hooks 18 or loops 20 or mushroom heads 22, respectively, for interlocking engagement with the corresponding elements. The hooking elements 21 can be produced on a support part 19 in the form of a synthetic woven fabric or synthetic knitted fabric using a method known from the prior art, as can be found, inter alia, in DE 10 2008 007 913 A1, with the fabric having projecting filaments, for example in the form of pile threads of a single-thread knitted fabric. The hooks 18 shown in FIG. 5 can be created by severing the loops 20, as they are provided as hooking elements 21 in FIG. 6. Mushroom heads 22, as they are shown in FIG. 7, can be obtained when pile threads, each of which has been severed at the upper arch thereof, are heated in such a way that the threads are deformed to produce mushroom heads. Adhesive elements 23, whereby the planar surfaces thereof make an adhesive connection possible, have heads wider than their stems to make hooking possible and can be produced using the forming method such as that described in DE 198 28 856 C1. Synthetic materials such as polyamide 6, polyamide 6.6, polyamide 12, inter alia, may be advantageously used. Polyamide 6, polyamide 6.6, polyphenylsulfone, inter alia, in the form of a synthetic woven fabric may be advantageously considered for support parts 19. Polyamide 6, polyphenylsulfone, and polypropylene are especially suitable for support parts in the form of a synthetic knitted fabric.

Figure 11:
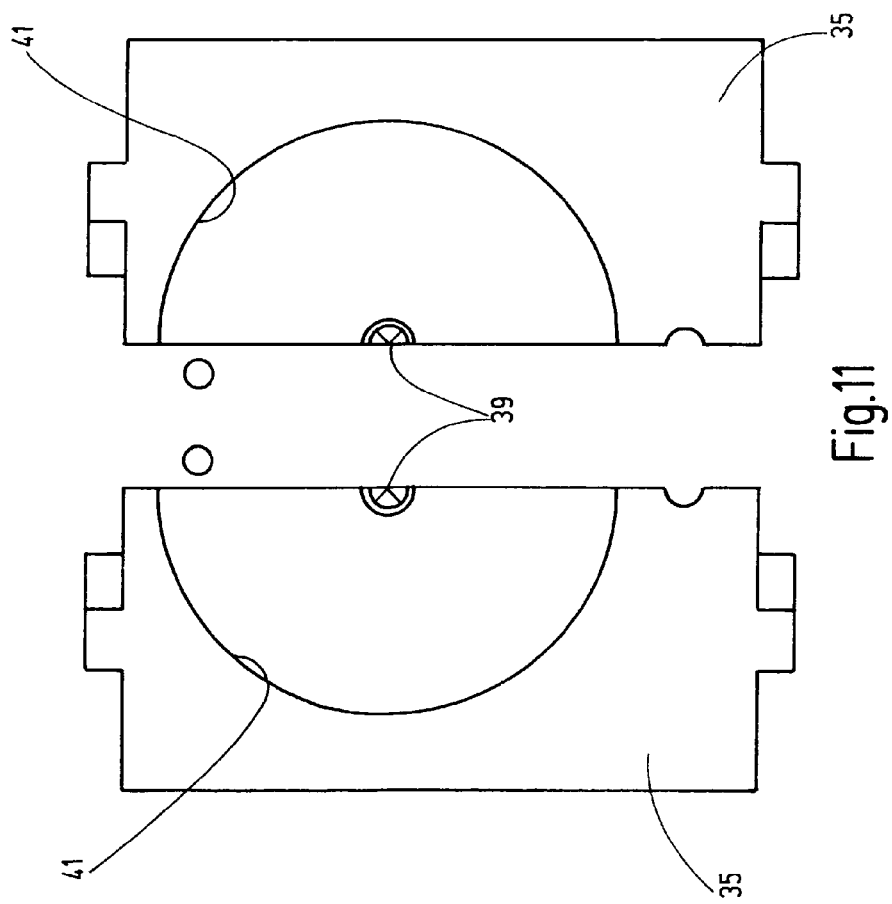
FIG. 11 is a front view of two mold parts of the first tool part positioned such that the parts have been moved apart from one another, depicted in a larger scale as compared to FIG. 9.

FIGS. 9 through 12 show essential components of an injection mold for producing the disk 3 provided as a connecting part using the back injection method. The base body 9 is formed from a thermoplastic synthetic material, such as polyamide or polypropylene, preferably having glass fiber reinforcement. FIGS. 9 and 10 show a first tool part 27 or, respectively, a second tool part 29, which can be placed against one another in order to seal the mold cavities formed therein. Of these, a first mold cavity 31 is provided in the first tool part 27, and a second mold cavity 33 is provided in the second tool part 29. The first mold cavity 31 is delimited by movable, identically designed mold parts 35, which are movable, and which are depicted in FIG. 11 in a position in which those mold parts have been moved apart from one another. In the closed position shown in FIG. 9, the mold parts 35 each form a mold half for forming the round disk shape of the base body 9. Of the hot runners for supplying the injection material, only one runner 37 is visible in FIG. 12. Runner 37 opens into the mold depression 39 of the mold part 35 shown and forms the catch 15 on the anchoring stud 13. The height of the edge 41 that delimits the first mold cavity 31 is selected in such a way that, in conjunction with the second mold cavity 33 of the second tool part 29, the desired thickness of the base body 9 above the anchoring stud 13, i.e., the desired thickness of the disk 3, is formed.

The prefabricated insertion part comprising the support part 19 with fastening part 11 can be inserted into the second mold cavity 33 formed in the second tool part 29 for the injection process. This mold cavity has a recessed, planar contact surface 45, which is enclosed by an edge 43, on which surface the fastening part 11 can be placed with the side having the adhesive or hooking elements 23, 21. To secure the insertion part placed in an aligned position before closing the injection mold, a ridge 47 is provided in the central region of the contact surface 45, which ridge projects from the plane thereof. This ridge has the form of a rectangular block having a contour, which is adapted to the size of a recess 49 formed in the support part 19 in such a way that the insertion part is secured by a fitted engagement of the ridge 47. A projecting, curved protuberance 51 extends in the longitudinal direction of the ridge 47 in the central region thereof, which protuberance forms the depression 17 in the base body 9 during the back injection process.

In conjunction with the region designated as X in FIG. 10, FIG. 10a shows a greatly enlarged view of a modified design of the surface of the contact surface 45 of the second mold cavity 33. In derogation from a completely smooth surface of the contact surface 45, in this variant, the surface is provided with micro-contouring 53. As a result of the micro-contouring, an optimal contact is provided for the adjoining adhesive or hooking elements 23, 21 of the fastening part 11 of the insertion part for the back injection process. The micro-contouring 53 may be formed by a pattern of fine grooves 57 and elevations 55; see FIG. 13. This Figure shows a sketch, which clarifies an advantageous method of producing the elevations 55 and grooves 57. As depicted in a) in FIG. 13, knurls can be used to form peaks 59 between the depressions 57. As b) in FIG. 13 shows, planar surface portions 61 can be formed between the grooves by grinding off the peaks 59. As c) in FIG. 13 shows, the planar surface parts 61 can be rounded by brushing in such a way that the rounded elevations 55 shown are created, which, in conjunction with the grooves 57, form an optimal micro-contour for the contact surface 45.

In FIG. 14, which shows a detail of the contour 53 in a state prior to full completion, of the peaks 59 formed by knurling and the surface parts 61 formed by grinding, not all are numbered. As shown, spaces are formed between the truncated cones delimited by the surfaces 61, which truncated cones will be rounded off to the free end thereof, in order to form the elevations 55 pursuant to FIG. 13c). These spaces serve to receive the adhesive or hooking elements 23, 21 of the fastening part 11 of the insertion part, in order that those elements are not inadvertently pressed together in the mold during the back injection process. The disk 3, which is completed after the back injection process, and which serves as a connecting part, therefore can securely affix the respective component that is to be secured, such as the floor mat 5.

Figure 15:
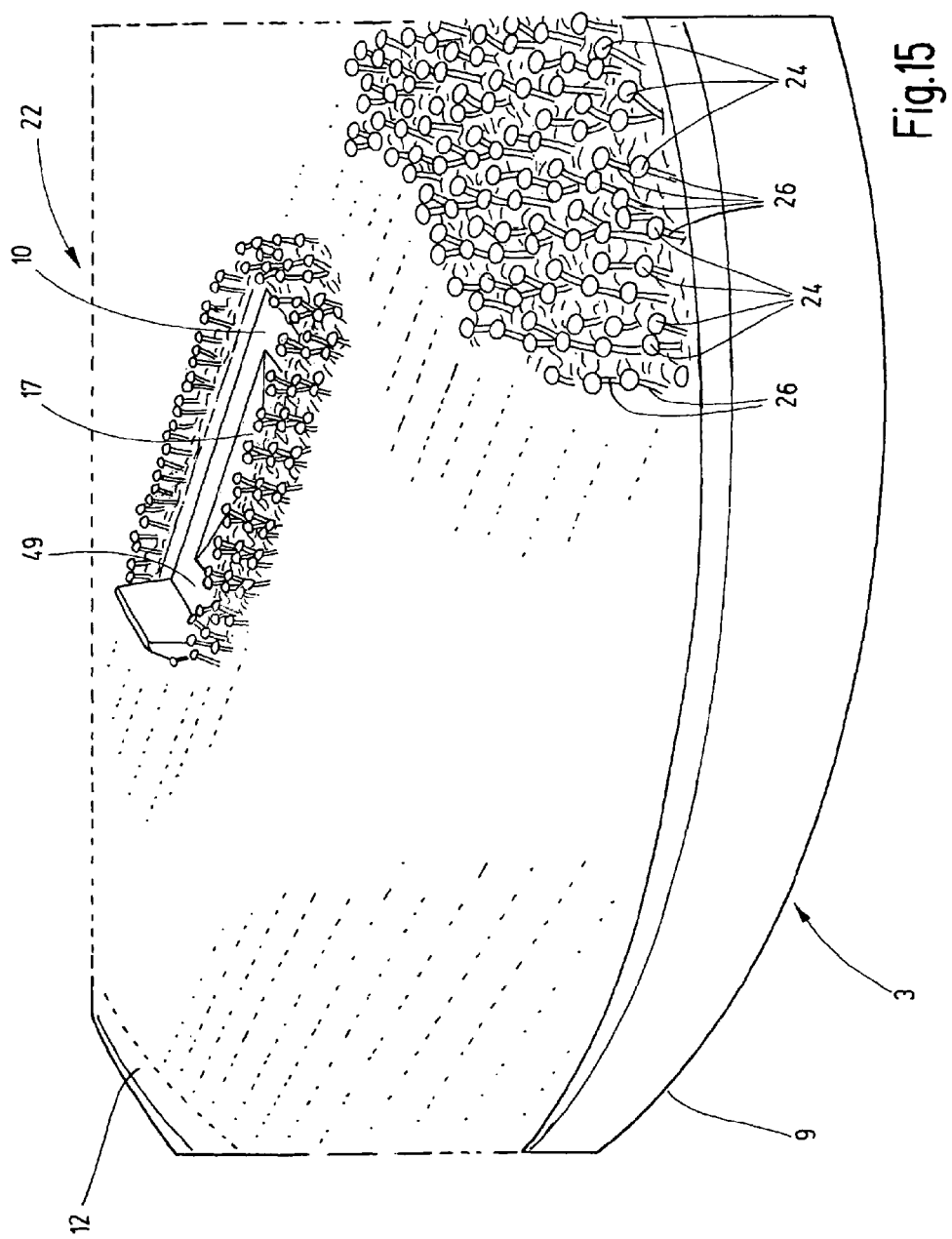
FIG. 15 is an enlarged perspective view of the connecting part according to the exemplary embodiment from FIG. 4, as viewed top down.

FIG. 15 shows a part of the upper side of the disk 3 of an exemplary embodiment, in which hooking elements in the form of mushroom heads 22 are provided in accordance with FIG. 4. As is also clear from FIG. 4, the circumferential outer edge 12 has a projection that extends above the plane of the upper side of the mushroom heads 22. When mounting the component that is to be attached, such as the floor mat 5, wherein the mushroom heads 22 can be hooked with a fleece material on attachment parts 7 of the floor mat 5, the circumferential outer edge 12 forms a sealing edge, which prevents dirt particles, which may appear on the floor area of a vehicle, from entering the fastener area unhindered. As can clearly be seen in the photomicrograph shown in FIG. 15, the mushroom heads 22 are designed in such a way that the diameter of the half-sphere-shaped head parts 24 (only some are numbered in FIG. 15) have approximately double the diameter of the round stems 26 (only some are numbered), wherein the stems 26 have approximately four times the length of the head parts 24.

Figure 16:
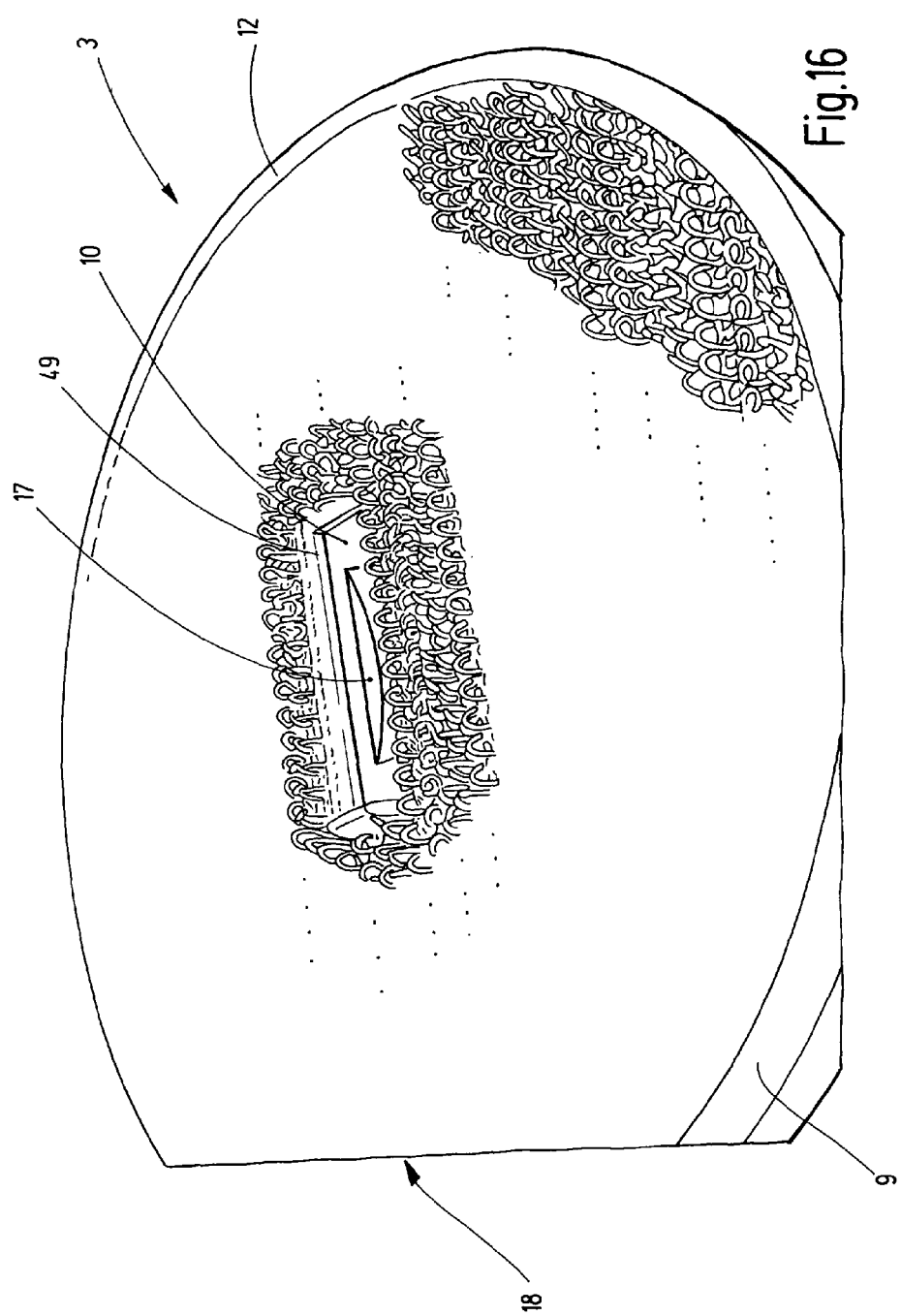
FIG. 16 is an enlarged perspective view of an exemplary embodiment of the connecting part having a fastening part with hooks.
Figure 17:
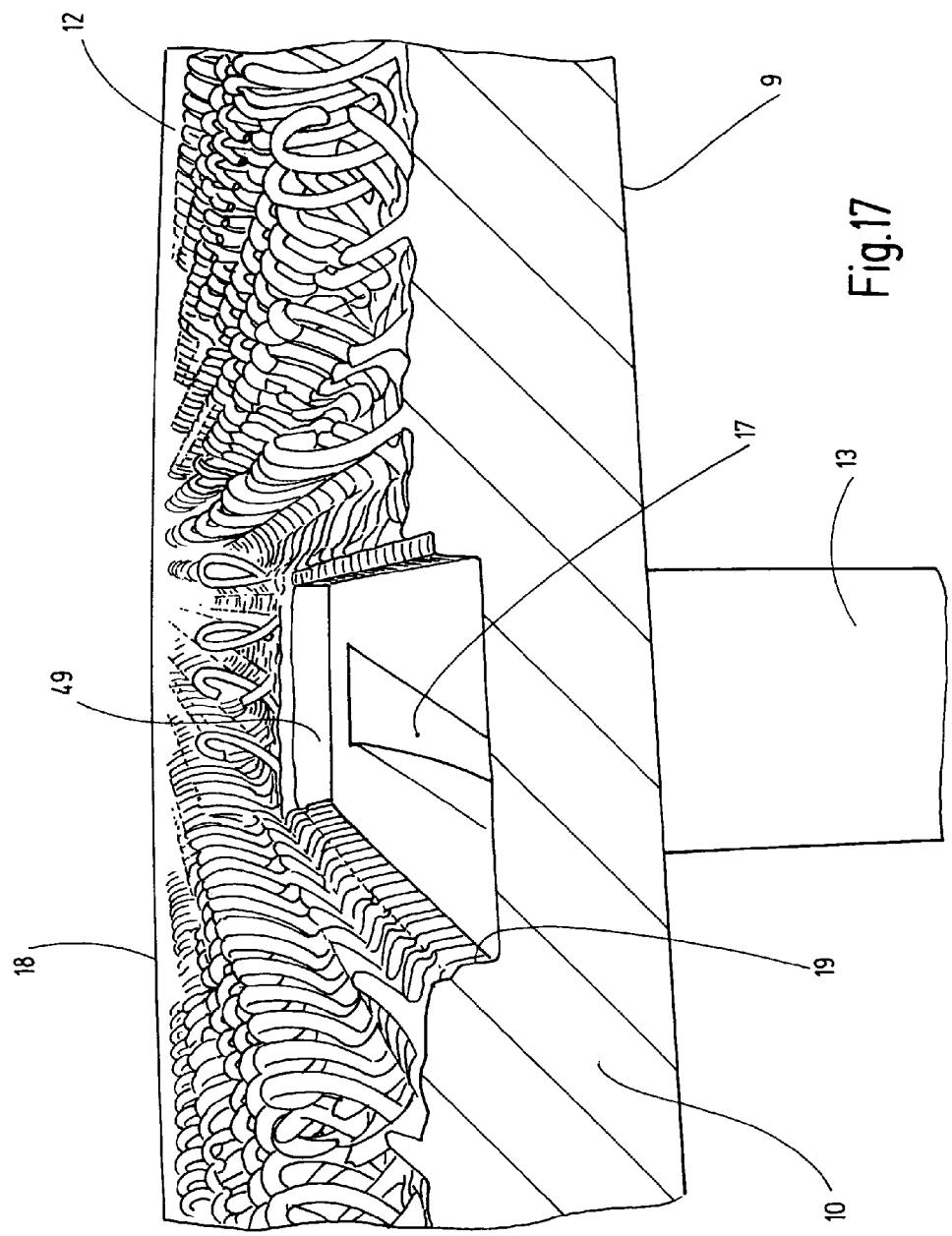
FIG. 17 is a partial, enlarged perspective view in section of the exemplary embodiment of FIG. 16.

Similarly in the manner of a photomicrograph, FIG. 16 depicts an exemplary embodiment of the disk 3, in which hooks 18 corresponding to those in FIG. 5 are provided as hooking elements. As in FIGS. 4 and 15, the circumferential outer edge 12 has a projection that extends beyond the plane of the upper side of the hooks 18. As shown in the further enlarged depiction of this example in FIG. 17, the support part 19, on which the hooks 18 are located, is made an integral component of the plate 10 of the base body 9 through the back injection process. The same applies to the support part 19 having the mushroom heads 22 in the exemplary embodiment in FIGS. 4 and 15.

In a similar depiction, FIG. 18 shows an exemplary embodiment having adhesive elements 23, which do not have round mushroom heads 22 at the upper end thereof. Instead, the heads have planar surface parts 25; see FIG. 8, in which adhesive elements 23 having this shape are depicted. Since these adhesive elements 23 may not only be considered for an interlocking engagement with correspondingly designed contact fastener elements, but may also form an adhesive connection (a gecko-like connection) having smooth contact surfaces, in this exemplary embodiment, the outer edge 12 of the otherwise uniformly designed disk 3 is designed such that it does not project, or only slightly projects above the surface parts 25 of the adhesive elements 23. Otherwise, the design of the disk 3 corresponds to that of the other exemplary embodiments.

Alternatively, the disk may be designed without the circumferential outer edge 12 projecting from the plane of the plate 10 of the base body 9, such that the insertion part extends with the support part 19 thereof to the outer circumference, or just short of the outer circumference of the plate 10.

While various embodiments have been chosen to illustrate the invention, it will be understood by those skilled in the art that various changes and modifications can be made therein without departing from the scope of the invention as defined in the claims.

What is claimed is:

1. A connecting part, comprising:
a base body of a body synthetic material;
a unitary, one-piece fastening part of a fastener synthetic material and having at least one of adhesive or hooking elements on one side of said fastening part and constituting a component of a contact fastener on a first side of said base body, said synthetic materials being intrinsically bonded with one another along at least one planar extending connection surface by forming a common molten mass, by being molded directly and by being in direct contact with one another without other structure between said synthetic materials forming a planar fused joint between said synthetic materials, the body synthetic material and the fastener synthetic material being different synthetic plastics; and
an anchor on a second side said base body capable of fixing said base body with said fastening part thereon to a structure, said second side being opposite said first side.

2. A connecting part according to claim 1 wherein
said base body comprises a round disk; and
said anchor comprises an anchoring stud projecting from a central region of said round disk as an integral part thereof capable of retaining engagement with the structure.

3. A connecting part according to claim 2 wherein
said anchoring stud comprises at least one laterally protruding retaining element on said anchoring stud.

4. A connecting part according to claim 3 wherein
said retaining element comprises at least one of catches projecting laterally and diametrically relative to one another or an outer thread.

5. A tool for producing a connecting part, the tool comprising:
a back injection molding first tool part having a first mold cavity capable of forming at least a large part of a base body of the connecting part with a body synthetic material; and
a back injection molding second tool part closing said first mold cavity and having a second mold cavity capable of receiving a fastener part of a fastener synthetic material, said first and second mold cavities being substantially of equal size the body synthetic material and the fastener synthetic material being different synthetic plastics forming a planar fused joint between said synthetic materials.

6. A tool according to claim 5 wherein
said second mold cavity comprises a positioner and retainer coupled to and capable of engaging, positioning and retaining the fastener part in the second mold cavity.

7. A tool according to claim 6 wherein
said second mold cavity comprises a contact surface on which the fastening part with a side thereof having at least one of adhesive or hooking elements; and
said positioner and retainer includes a mold part in a central region thereof and projects from a contact surface thereof, said mold part engaged in a recess in the fastener part designed for said mold part.

8. A tool according to claim 7 wherein
said mold part comprises a rectangular ridge having a contour adapted to the recess in the fastening part, said rectangular ridge having a projection in a form of a protuberance forming a depression in the base body during a back injection molding process.

9. A tool according to claim 5 wherein
an entire contact surface of said second mold cavity comprises micro-contouring in a pattern of fine depressions and projections.

10. A fastening system, comprising
a component, having an attachment part connected thereto, said attachment part having first adhesive or hooking elements thereon;
a structure; and
a connecting part on said structure, said connecting part including a base body of a body synthetic material;
a unitary, one-piece fastening part of a fastener synthetic material and having at least one of adhesive or hooking elements on one side of said fastening part and constituting a component of a contact fastener on a first side of said base body, said synthetic materials being intrinsically bonded with one another along at least one planar extending connection surface by forming a common molten mass, by being molded directly and by being in direct contact with one another without any other structure between said synthetic materials forming a planar fused joint between said synthetic materials, the body synthetic material and the fastener synthetic material being different synthetic plastics; and
an anchor on a second side said base body fixing said base body with said fastening part thereon to said structure, said second side being opposite said first side, said adhesive or hooking elements on said connecting part corresponding and mating with said adhesive or hooking elements on said attachment part.

11. A fastening system according to claim 10 wherein
each of said attachment part and said connecting part are disk-shaped.

12. A fastening system according to claim 10 wherein
said component comprises a vehicle floor mat; and
said structure comprises a vehicle floor.

13. A connecting part according to claim 1 wherein
the base body comprises a knitted or woven fabric with the adhesive or hooking elements formed from filaments of the knitted or woven fabric.

14. A fastening system according to claim 10 wherein
said base body comprises a round disk; and
said anchor comprises an anchoring stud projecting from a central region of said round disk as an integral part thereof capable of retaining engagement with the structure.

15. A fastening system according to claim 14 wherein
said anchoring stud comprises at least one laterally protruding retaining element on said anchoring stud.

16. A fastening system according to claim 15 wherein
said retaining element comprises at least one of catches projecting laterally and diametrically relative to one another or an outer thread.

17. A fastening system according to claim 10 wherein
the base body comprises a knitted or woven fabric with the adhesive or hooking elements formed from filaments of the knitted or woven fabric.

\* \* \* \* \*